Nov. 19, 1935.  E. D. BROWN  2,021,441

CUTTING MACHINE TRACK

Filed Feb. 28, 1934  2 Sheets-Sheet 1

Inventor
Ellsworth D. Brown

By Hardway Cather
Attorneys

Nov. 19, 1935.  E. D. BROWN  2,021,441
CUTTING MACHINE TRACK
Filed Feb. 28, 1934  2 Sheets-Sheet 2
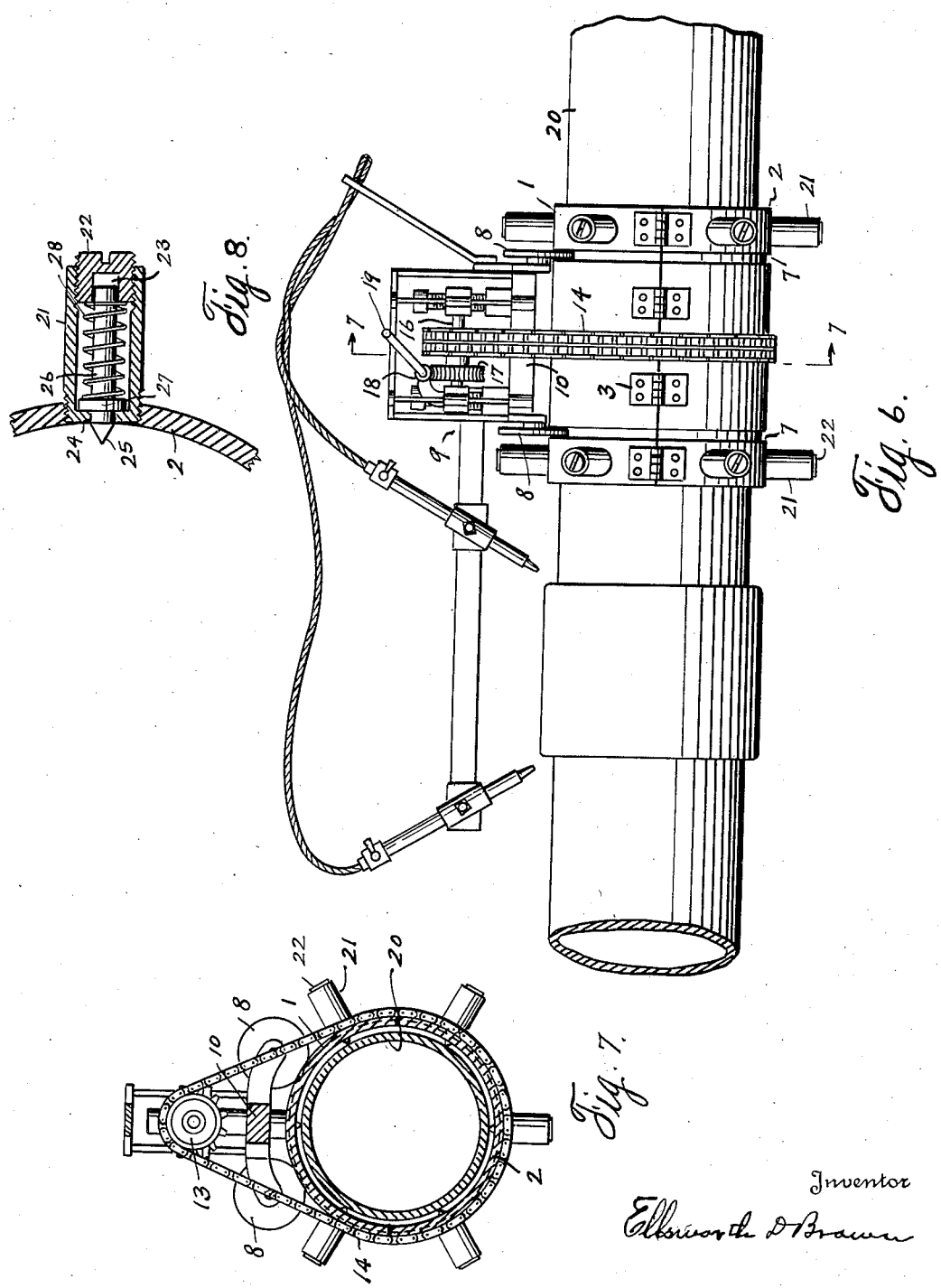

Patented Nov. 19, 1935

2,021,441

UNITED STATES PATENT OFFICE 2,021,441

CUTTING MACHINE TRACK

Ellsworth D. Brown, Houston, Tex.

Application February 28, 1934, Serial No. 713,405

4 Claims. (Cl. 266—23)

This invention relates to a cutting machine track.

An object of the invention is to provide a track specially adapted for application to a pipe or pipe line which is to be cut by a pipe cutting machine such as an oxy-acetylene cutting machine.

In dismantling a pipe line the line is uncovered and lifted from the ground and cut usually by an oxy-acetylene cutting machine and it is desirable that smooth cuts be made so that the ends of the pipe will fit closely together when the pipe is again welded into a line so as to make a more perfect weld.

It is therefore desirable that the machine be provided with a smooth track so that the machine will move in a uniform direction around the pipe in order that a straight cut may be made. At the present time the cutting machine is mounted to move directly on the pipe to be cut, but this pipe is usually pitted and of an uneven surface and when the pipe itself is used as a track the cut will be irregular on account of the irregular movement of the cutting machine around the pipe. Furthermore, if the pipe is used as a track, a considerable surface of the pipe must be cleansed so as to remove coating substances that may adhere thereto at the point where the machine is mounted and even when so cleansed, the pipe will still be rough and pitted and provide an imperfect track also it often happens that the pipe to be cut does not lie horizontally as where the line runs over a hill or mountain and in such case if the cutting machine is not provided with a definite track to guide it, it will have a tendency to move downwardly as it travels around the pipe, thus making a spiralled cut. It is the prime object of this invention to provide a track for the cutting machine that may be easily applied to the pipe line without the necessity of cleansing the surface of the line and that will direct the cutting machine in a definite and regular course about the pipe line, while the cut is being made.

With the above and other objects in view, the invention has particular relation to certain novel features of construction, operation and arrangement of parts, an example of which is given in this specification and illustrated in the accompanying drawings, wherein:

Figure 6 shows a side view of a pipe line with the track applied thereto and the cutting machine mounted on the track.

Figure 7 shows a cross sectional view taken on the line 7—7 of Figure 6, and

Figure 8 shows an enlarged fragmentary cross sectional view taken on the line 8—8 of Figure 2.

Figure 1:
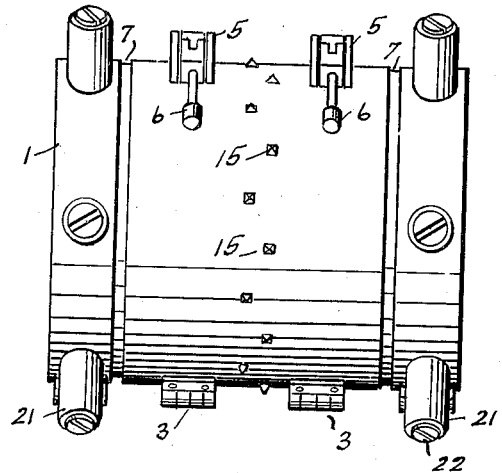
Figure 1 shows a side elevation of the track.
Figure 2:
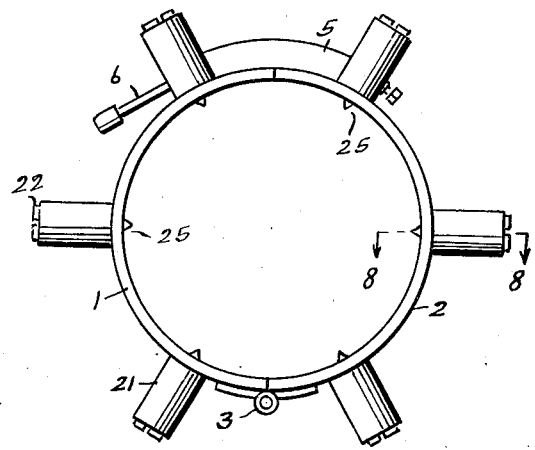
Figure 2 shows an end view.
Figure 3:
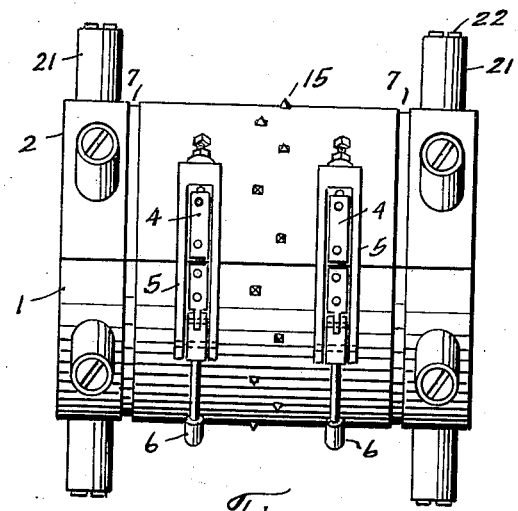
Figure 3 shows a side elevation taken at right angles to the view shown in Figure 1.
Figure 4:
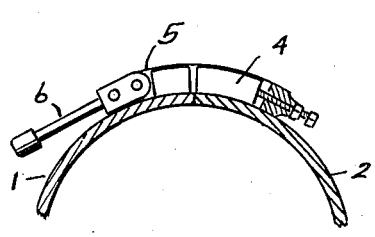
Figure 4 shows a fragmentary vertical sectional view showing the latch in engaged position.
Figure 5:
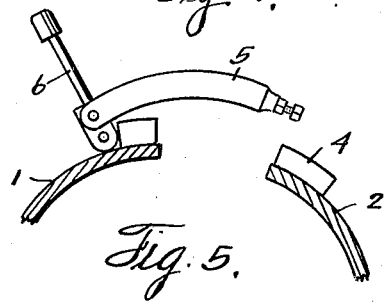
Figure 5 shows a fragmentary vertical sectional view showing the latch released.

Referring now more particularly to the drawings the numerals 1, 2 designate complemental arcuate sections of the track which are hinged together at one side by hinges as 3. At the other side the section 2 has the lugs 4 arranged to be engaged by the stirrups 5 of the latch, said stirrups being pivoted to the corresponding hand levers 6 which are pivoted to the section 1, whereby said sections may be secured together, in tubular form, or released. These latches are of conventional type now in common use. The track has the external grooves 7, 7 therearound to receive the wheels 8 of the cutting machine 9. This cutting machine is of conventional construction. It includes the frame 10 which is mounted on said wheels and it is equipped with a driving sprocket wheel 13, over which the chain 14 operates. The track has the rows of external sprocket teeth 15 therearound over which the chain 14 also operates. The sprocket wheel 13 is fixed on the shaft 16 which is rotatably mounted in the frame 10 and which has a worm gear 17 fixed thereon which is in mesh with and driven by a screw gear 18 which may be manually driven through the crank 19. As the crank 19 is turned the sprocket 13 will be correspondingly rotated and the machine will be caused thereby to revolve around the pipe line 20 on which the track is mounted, the wheels 8 moving in the grooves 7. The machine will thereby be caused to follow a true course about the pipe line and the torch or torches of the cutting machine will make a smooth cut, or cuts, around the pipe line. At each end of the track there are the radial tubular housings 21 whose outer ends have the plugs 22 screwed therein, whose inner ends have the relatively deep sockets 23. The inner ends of the housings have the central bearings 24 through which the centering points 25 project. These points have the extended shanks 26 whose outer ends project into the corresponding sockets 23. The inner ends of the shanks 26 have the stops 27 which limit the inward movement of the centering points and around said shanks are the strong coil springs 28 which are interposed between the corresponding stops 27 at one end and the plugs 22 in the other. When the track is mounted on the pipe line the centering points 25 will center at about said line but the springs 28 will yield to permit the centering points 25 to conform themselves to the uneven surface of the line on which the track is mounted.

The drawings and description disclose what is now considered to be a preferred form of the invention, by way of illustration only, while the broad principle of the invention will be defined by the appended claims.

What I claim is:—

1. A track formed of complemental sections and shaped to surround a pipe; means for securing the track about the pipe, said track having external guide means therearound for guiding a pipe cutting machine around the pipe, and sprocket teeth around the track to cooperate with a propelling sprocket chain of the machine.

2. A track shaped to surround a pipe and formed of complemental sections hinged together, means for securing said sections in a tubular assembly about the pipe, yieldable centering means mounted on the track and arranged around and engageable with the surrounded pipe, whereby the track is maintained against movement relative to the pipe.

3. A track shaped to surround a pipe and formed of complemental sections hinged together, means for securing said sections in a tubular assembly about the pipe, yieldable centering means mounted on the track and engageable with the surrounded pipe, whereby the track is held centered and maintained against movement relative to the pipe, and peripheral grooves forming guide means around the track for guiding a pipe cutting machine around the pipe.

4. A track shaped to surround a pipe and form of complemental sections hinged together, means for securing said sections in a tubular assembly about the pipe, yieldable centering means mounted on the track and engageable with the surrounded pipe whereby the track is maintained against movement relative to the pipe, said centering means comprising radial centering points arranged around the track at each end and projecting inwardly to engage the pipe, means for maintaining said points in yieldable engagement with the pipe and means for limiting the inward movement of said points.

ELLSWORTH D. BROWN.